United States Patent Office 3,088,829
Patented May 7, 1963

3,088,829
GLAZED BAKERY PRODUCT AND METHOD
OF MAKING SAME
Robert M. Rapaport, Prairie Village, Kans., assignor to Food Products Corporation, Inc., Kansas City, Kans., a corporation of Kansas
No Drawing. Filed Feb. 16, 1961, Ser. No. 89,646
5 Claims. (Cl. 99—139)

This invention relates to a new and improved composition and method for producing an attractive surface glaze on edible bakery products, and more particularly to a substitute for the egg wash compound and method generally used for this purpose.

It is common practice in the baking industry to produce a decorative, esthetically satisfying surface shine or glaze on a large variety of breads, buns, rolls, pastries, pies and other bakery products. This glaze is generally delicately colored and imparts an appetizing appearance to the product but adds a negligible amount of food value. Heretofore, this glaze has been obtained by the application on the product usually at some point prior to the final baking step, or immediately thereafter (while hot), of an egg wash compound consisting essentially of a thin liquid mixture prepared by blending one volume of shelled whole eggs with about one volume of water. It is the common practice to add to this basic egg-water mixture a number of additional ingredients, for example, coloring material, milk, sugar and honey, which ingredients provide variations in the final glaze and sometimes a trace of taste. The egg wash compound is generally applied by wiping, painting or spraying. In most cases, the wash compound is applied immediately prior to the time the products go into the oven.

The use of a compound having eggs as the principal ingredient results in several disadvantages. The formulation is comparatively expensive and products containing a large percentage of fresh whole eggs are highly susceptible to spoilage. In addition, the usual methods of applying the egg wash compound to the bakery products are likely to result in a splattering on nearby surfaces and equipment which, due to the disposition of eggs to support the growth of extensive microflora, mold and bacteria, requires that very careful and stringent sanitation procedures be followed to avoid conditions which would otherwise make the premises unfit for food production.

It is the principal object of the present invention to provide a composition and method which imparts an attractive surface glaze to bakery products without the disadvantages entailed by the use of a compound containing a large percentage of whole eggs; to provide such a composition which is economical to produce; to provide such a composition which has only slight tendencies to support the growth of microorganisms; to provide such a composition which involves little risk of contamination resulting from sanitation failures; to provide an egg wash substitute which imparts an attractive and esthetically pleasing glaze of bakery products but which costs less than one-tenth that of the traditional egg wash, is easier to store, may be applied by the same methods, and is adapted to receive the various additives often used with the traditional egg wash.

Other objects and advantages of this invention will become apparent from the following description wherein is set forth by way of example certain embodiments of this invention.

The essential ingredient comprising the glazing composition of this invention is acetylated starch which, at the concentration employed in the final composition as described hereinafter, yields a rather thin liquid. The acetylated starch is of the type commonly available and used commercially for sizing textiles and papers. Acetylated starch may be produced in a variety of ways, but the usual method consists of treating intact ungelled starch with acetic anhydride and then removing the acetic acid formed as a by-product. The most satisfactory products of this type are the acetylated starches developed originally for sizing paper used in food wrappers, and particularly such starches which are made without using a toxic catalyst such as pyridine. A typical product of this type is presently trademarked "Kofilm 80" and is manufactured by the National Starch Company.

An example of a mix which yields a highly satisfactory substitute for the traditional egg wash compound is as follows.

| Ingredient: | Parts by weight |
|---|---|
| Acetylated starch | 75 |
| Corn starch | 3.25 |
| Gelled starch | 3 |
| Sugar | 5.5 |
| Corn oil | 5 |
| Whey solids | 4 |
| Salt | 3 |
| Sodium propionate | 1 |
| Annatto cake color | .25 |

The composition is prepared first as a dry mix by carefully blending the dry ingredients and then adding the annatto color dissolved in the corn oil to produce the final mix. If desired, the final mix might be given uniformity and a homogenous appearance by passing it through any one of several commonly available blending machines.

The glaze composition is prepared by slurrying or dispersing one to two parts of the above described final mix in ten parts of cold water, and bringing the same substantially to the temperature of steam in a double boiler. This temperature is maintained for about fifteen minutes to obtain a sterile and rather viscous liquid which gives the appearance of the egg wash compound traditionally used for this purpose.

The improved glazing composition may be applied to bakery products in the same manner as the usual egg wash compound, that is, by wiping, painting or spraying, prior to the final baking step, or immediately thereafter, and may be stored in a refrigerator for several days without spoilage or loss of functionality.

The acetylated starch is the ingredient which produces the thin, shiny, egg-like film on the bakery products. The film produced by the acetylated starch alone with water is, however, colorless and somewhat lacking in luster. The carbohydrates in the above mix, that is the sugar and the lactose in the whey, provide some degree of caramelization during the baking process which improves the luster of the glaze. It is noted that other simple sugars could be substituted in the above mix to produce the same effect.

The oily ingredients in the formula, that is, the corn oil and annatto color, improve the characteristics of the dry powder or dry mix by reducing dustiness and adding a pleasing color thereto. The oily ingredients also help impart a highly desirable sheen to the final glaze as it appears on the baked product. It is apparent, however, that the type and percentage composition of the edible oil, as well as the type and percentage composition of the coloring ingredient, can be varied within wide limits without departing from the scope of this invention.

The trace of whey solids in the composition adds to the final luster or appearance. However, these solids contain protein which will support the growth of microorganisms. When whey solids are included in the mix or formula, it has been found desirable to add a small portion of sodium propionate and salt as inhibitors to prevent spoilage, although even without such inhibitors the improved composition is much less susceptible to spoilage than the commonly used egg wash compound described above. Other inhibitors such as sodium benzoate or potassium sorbate may also be employed if desired. It is noted that without the whey solids the composition is virtually immune to spoilage even without the addition of preservatives.

The acetylated starch alone with water at the concentration employed yields a rather thin liquid. The raw (corn) starch and pre-gelatinized starch are included as bodying agents which increase viscosity to permit the use of standard egg wash handling and applying procedures. Other starches and gums could obviously be substituted to act as bodying agents.

Two pounds of the final mix described above will yield about twelve pounds of the improved glaze producing composition. At current prices, it is estimated that the cost of producing the improved composition is less than one-tenth the cost of producing a compound comprised of fifty percent whole eggs and water.

The ingredients making up the mix are relatively stable and the final mix can be stored with little danger of spoilage. The glazing composition may be used at room temperature.

It is to be understood that while I have described a specific example of my invention, the ingredient ratios can be varied rather widely and some of the ingredients eliminated entirely without departing from the spirit of my invention. I, therefore, wish to be limited herein only insofar as such limitations are included in the following claims.

What I claim and desire to secure by Letters Patent is:

1. A bakery product having a decorative, spoilage-resistant glaze on the surface thereof, said glaze comprising at least a major part of acetylated starch and characterized by being deposited on said product with a water vehicle wherein said acetylated starch forms a dispersal product and is dispersed in a proportion of about one to two parts by weight of acetylated starch to ten parts by weight of water and wherein a major portion of said water evaporates with heat generated during baking of said product.

2. A bakery product as in claim 1 wherein acetylated starch comprises a major portion of said dispersal product and a bodying agent in the form of non-acetylated starch comprises a minor portion of said dispersal product in said water vehicle.

3. A bakery product as in claim 1 wherein said acetylated starch forms about 75% by weight of said dispersal product and the remainder substantially includes a bodying agent, carbohydrate and protein together with a coloring agent and preservative and the proportion by weight of said dispersal product in said water is about ten to one.

4. The process of producing a glaze on a bakery product comprising, mixing a composition of about one to two parts by weight of acetylated starch to ten parts by weight of water forming a liquid, applying said liquid to the outer surface of the bakery product and applying heat to substantially evaporate said water from said liquid.

5. The process of producing a glaze on bakery products comprising, forming a dispersal product of approximately 75% by weight of acetylated starch and 25% by weight of a bodying agent, carbohydrate and protein together with a coloring agent and preservative, mixing approximately one to two parts by weight of said dispersal product to ten parts by weight of water forming a liquid, applying said liquid to the outer surface of the bakery product and applying heat to substantially evaporate said water from said liquid.

References Cited in the file of this patent

UNITED STATES PATENTS

| | | |
|---|---|---|
| 458,420 | Furber | Aug. 25, 1891 |
| 2,461,139 | Caldwell | Feb. 8, 1949 |
| 2,651,574 | Whittier | Sept. 8, 1953 |
| 2,861,889 | Carman | Nov. 25, 1958 |

OTHER REFERENCES

Cassell's Dictionary of Cookery, Cassell, Petter, Galpin & Co., New York, page 259.